United States Patent
Manda

(10) Patent No.: US 7,695,654 B2
(45) Date of Patent: Apr. 13, 2010

(54) METHOD OF MOLDING SYSTEM, INCLUDING RAISING TEMPERATURE OF FEEDSTOCK RESPONSIVE TO A CALCULATED AMOUNT OF THERMAL ENERGY

(75) Inventor: Jan Manda, Toronto (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 227 days.

(21) Appl. No.: 11/935,516

(22) Filed: Nov. 6, 2007

(65) Prior Publication Data
US 2009/0115086 A1   May 7, 2009

(51) Int. Cl.
*B29C 45/78* (2006.01)
*B22D 17/32* (2006.01)

(52) U.S. Cl. ............... 264/40.6; 164/155.6; 425/143
(58) Field of Classification Search ............... 264/40.6; 425/143; 164/155.6, 154.6
See application file for complete search history.

(56) References Cited

U.S. PATENT DOCUMENTS

| | | | | |
|---|---|---|---|---|
| 3,146,287 A | * | 8/1964 | Kleine-Albers | ........ 264/328.13 |
| 4,272,466 A | | 6/1981 | Harris | |
| 4,548,341 A | | 10/1985 | Hambleton | |
| 4,863,652 A | | 9/1989 | Chang | |
| 5,272,644 A | | 12/1993 | Katsumata et al. | |
| 5,397,515 A | | 3/1995 | Searle et al. | |
| 5,419,858 A | | 5/1995 | Hata et al. | |
| 5,486,105 A | * | 1/1996 | Katsumata | ................... 425/143 |
| 5,776,513 A | | 7/1998 | Honjo et al. | |
| 5,898,591 A | | 4/1999 | Hettinga et al. | |
| 6,104,006 A | | 8/2000 | Kimura et al. | |
| 6,649,095 B2 | | 11/2003 | Buja | |
| 2006/0253221 A1 | | 11/2006 | Katsuta et al. | |

FOREIGN PATENT DOCUMENTS

| | | |
|---|---|---|
| CA | 2142756 C | 11/1995 |
| JP | 08197610 A | 8/1996 |
| JP | 10315291 A | 12/1998 |
| JP | 2001225372 A | 8/2001 |
| JP | 2002154144 A | 5/2002 |
| WO | 2007106974 A1 | 9/2007 |

OTHER PUBLICATIONS

Gerber et al. "CFD-based predictive control of melt temperature in plastic injection molding", Science Direct, from Applied Mathematical Modelling vol. 30 Issue 9, Sep. 2006, pp. 1-29.*

* cited by examiner

*Primary Examiner*—Jill L Heitbrink
(74) *Attorney, Agent, or Firm*—Husky Intellectual Property Services

(57) ABSTRACT

Disclosed is a molding-system method, including a temperature-changing operation, including changing temperature of a feedstock being positioned in a barrel assembly from an out-of-barrel temperature to substantially within a processing-temperature range, in response to supplying a calculated amount of thermal energy to the barrel assembly based on a melt throughput being associated with molding articles.

17 Claims, 6 Drawing Sheets

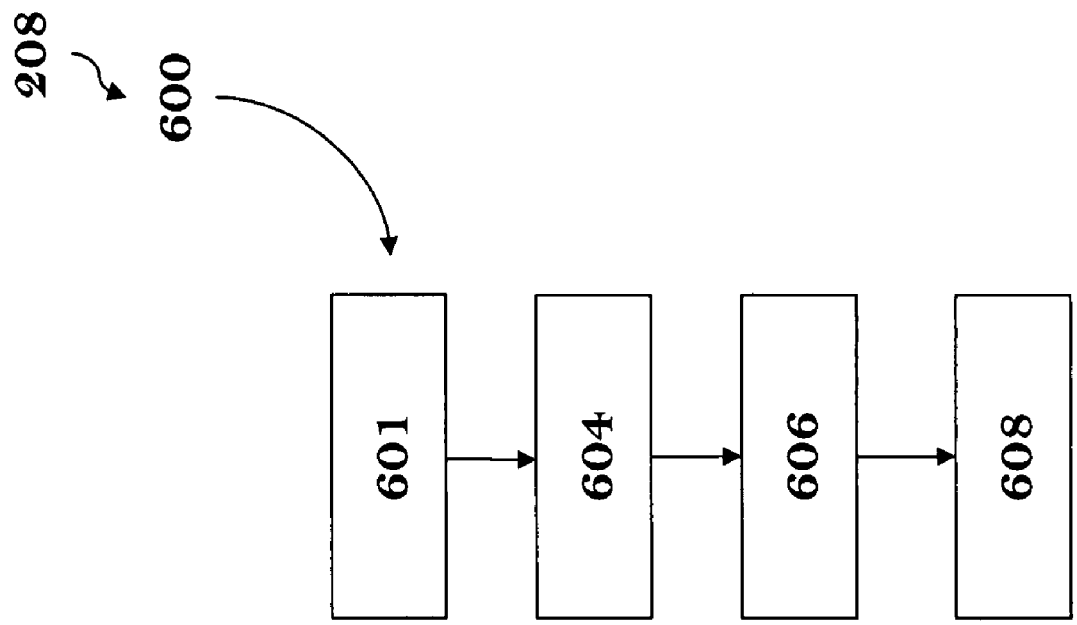
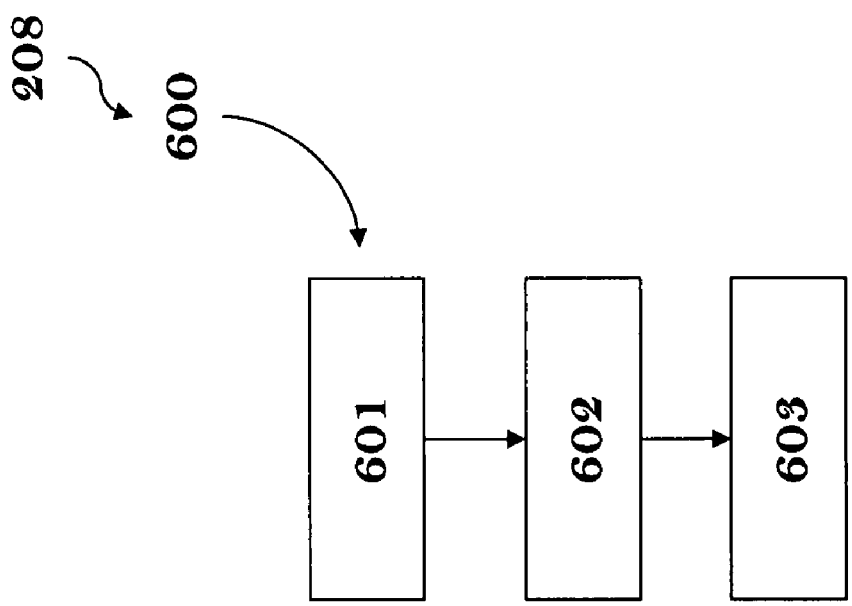

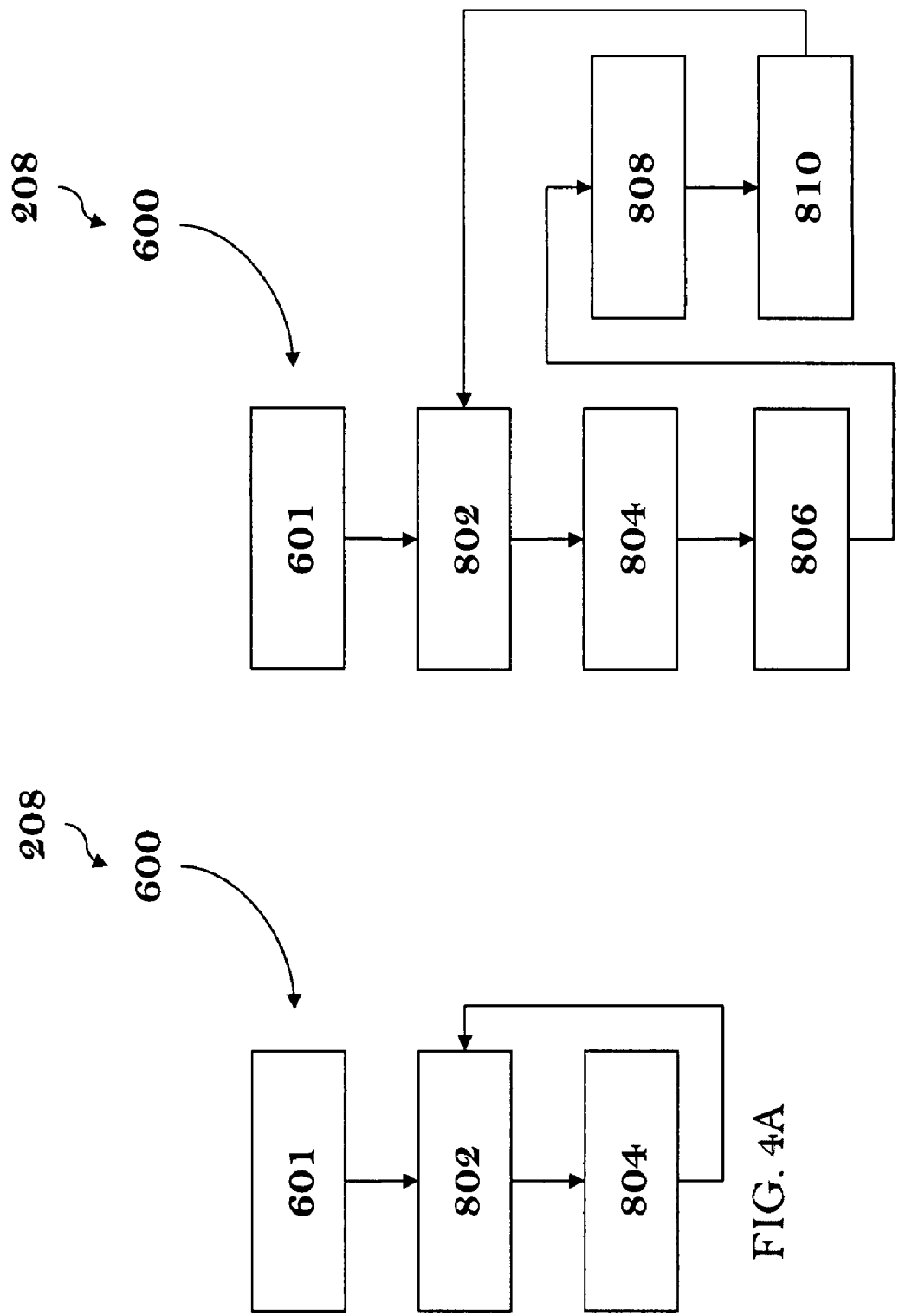

METHOD OF MOLDING SYSTEM, INCLUDING RAISING TEMPERATURE OF FEEDSTOCK RESPONSIVE TO A CALCULATED AMOUNT OF THERMAL ENERGY

TECHNICAL FIELD

The present invention generally relates to, but is not limited to, molding systems, and more specifically the present invention relates to, but is not limited to, a molding-system method of a molding system, and/or an injection-molding system, and/or a metal injection-molding system.

BACKGROUND

Examples of known molding systems are (amongst others): (i) the HyPET (TRADEMARK) Molding System, (ii) the Quadloc (TRADEMARK) Molding System, (iii) the Hylectric (TRADEMARK) Molding System, and (iv) the HyMET (TRADEMARK) Molding System, all manufactured by Husky Injection-molding systems (Location: Canada; Web Site: www.husky.ca).

U.S. Pat. No. 4,272,466 (Inventor: HARRIS; Published: Jun. 9, 1981) discloses a molding-system method for controlling temperature of a plastics extruder that uses a deep well sensor and a shallow well sensor in each temperature control zone along an extruder barrel. The temperature indications of these sensors are not combined. The shallow well sensor detects temperature near the barrel surface. An associated computer compares the sensor temperature with a preset temperature set point. The differences between the detected and set temperature are used by the computer to effect heating or cooling of a temperature control zone. Each deep well sensor is located proximate a bore (that is, a melt pathway) in which the plastic is moved. The deep well sensor temperature indication is compared with the set point of a second computer. Based on variations of the temperature relative to the set point, an error signal is generated, and in turn the output of a heater is adapted. The computer compares a set point with that of the melt temperature, and modifies the set points of the several zones along the extruder barrel to correct the melt temperature.

U.S. Pat. No. 4,548,341 (Inventor: HAMBLETON; Published: Oct. 22, 1985) discloses a plastic injection apparatus that has: (i) a barrel, (ii) a plastic working screw located in the bore (that is, a melt pathway) of the barrel, (iii) a nozzle for injecting melted plastic from out of the front of the bore to a mold, and (iv) a plurality of axially spaced heater bands ringing the barrel over its length. The heat control for the plastic injection apparatus is improved by: (i) subdividing the barrel into a rear part and a front part, (ii) impeding an outward flow of heat energy from the rear part by using a thermal insulating material and by using a heat reflective surface, and (iii) promoting the outward flow of heat energy from the front part by using a cooling means and by using a tubular barrel cover, which encloses the front part. The tubular barrel cover has an inner surface and an outer surface, which are heat absorptive and heat reflective, respectively. In one embodiment, the thermal insulating material is incorporated in a tubular insulating shroud that encloses the heater bands in the rear part.

U.S. Pat. No. 5,272,644 (Inventor: KATSUMATA et al; Published: Dec. 21, 1993) discloses a heating-control apparatus that is used for controlling a heating temperature, especially for heating a resin in the injection molding machine. The heating-control apparatus includes: (i) a control device for controlling a heating means and the heating state of a heated barrel, and (ii) a condition compensating device for issuing a compensation input to the heating means in response to a reset of the control device (depending on the kinds of resin materials and molding conditions) so as to prevent: (i) insufficient moldability in the injection molding machine, and (ii) a deterioration of the resin.

U.S. Pat. No. 5,776,513 (Inventor: HONJO et al; Published: Jul. 7, 1998) discloses a device for: (i) controlling temperature of a nozzle of an injection molding machine, (ii) maintaining uniform temperature over the nozzle, and (iii) preventing stringiness or drooling of melted resin. A temperature-monitoring computer is used for controlling temperature at a front portion and at a rear portion of the nozzle by controlling the electric power supplied to a front heater and to a rear heater by using an "ON-OFF" operation of a relay and of a voltage regulator. The relay and the voltage regulator are used for controlling voltage applied to (by use of an operational amplifier): (i) the front heater, or (ii) the rear heater. The operational amplifier is used for detecting differences of temperature at the front portion and the rear portion of the nozzle.

U.S. Pat. No. 6,104,006 (Inventor: KIMURA et al; Published: Aug. 15, 2000) discloses a molding-system method and an apparatus for programmed temperature control of a heating barrel in which a thermal sensor can be set selectively in a plurality of sensor holes on a feeding zone of the heating barrel. By sensing the temperature at the most appropriate position in the feeding zone, the molding injection process is adapted to various resins with different properties, which prevents clogging of resin in the heating barrel and changed color of molded articles.

SUMMARY

The inventor believes that the problem associated with heating the barrel assembly is not well understood by persons of skill in the art, and that by understanding the nature of the problem (as understood by the inventor), the aspects of the present invention may be better appreciated. Generally, known molding systems include a barrel assembly that is used to process a melt. Barrel heaters are coupled to an outer wall of a barrel assembly, and the heat energy is transferred from the barrel heaters through the barrel assembly to the melt that is disposed in the melt passageway of the barrel assembly. Temperature sensors (such as thermocouples) are coupled with a wall of the barrel assembly between the barrel heaters and the melt. A known computer (that operates in accordance with the known method) includes: (i) sensor inputs coupled with the temperature sensors, and (ii) control outputs (hereafter referred to as "outputs") coupled with the barrel heaters. The known computer uses a method for controlling the temperature of the barrel heaters responsive to a comparison computation that is made between: (i) the measured temperature of the temperature sensors, and (ii) temperature set points associated with the temperature sensors. Typically, the known computer uses a feedback loop, such as a PID (Proportional Integral Differential) algorithm, to regulate or to control the amount of heat energy supplied by the barrel heaters to the barrel assembly. The inventor notes that the temperature of the melt is not measured, but that the temperature of the barrel is measured. In this manner, the temperature of the barrel assembly is monitored and controlled during: (i) a no-throughput condition, and (ii) a throughput condition of the molding system. The no-throughput condition is when melt is not flowing through the barrel assembly in the form of shots. The throughput condition is when the melt flows through the barrel assembly in the form of shots that are injected under pressure into a mold cavity of a mold. What is typically representative for the known method is that the primary engineering philosophy in achieving a desired melt temperature for processing or manufacturing molded articles is that: (i) the set points are chosen for the temperature sensors, and (ii) a comparison is made between the set points and the measured barrel temperature. The inventor notes that a comparison is not made between the set points and the actual or measured temperature of the melt in the barrel assembly; therefore the inventor believes that the known method may be acceptable for controlling the temperature of the barrel assembly during the no-throughput operation, but the known control method does not adequately control the temperature of the melt flowing through the barrel assembly during the throughput condition.

The inventor believes that if the known method is used, choosing the correct set points for the thermal sensors for a specific molding process for molding articles will not be easy to achieve because the set points will drive the control algorithm for controlling the barrel heaters (and thus ultimately controlling the temperature of the barrel assembly, and not for controlling the temperature of the melt). The inventor believes that if the set points are incorrectly selected (which more often the case than not), the molding process will likely not be (disadvantageously) controlled in an optimum way that helps to improve control of the temperature of the melt. In addition, the position of the temperature sensors relative to the melt, and the quality of the contact between the temperature sensor and the wall of the barrel assembly are both factors that may affect accuracy of the temperature measurement of the melt that may be implied from the thermal sensors. Also, the long-term reliability of thermocouples and thermal sensors may not be too low for long-term, error-free operation of molding systems.

The problem, as understood by the inventor, is as follows: the temperature measurement associated with the known art (as identified above) provides an indication of melt temperature when a molding system is placed in the no-throughput condition. In the no-throughput condition, the melt remains in the barrel assembly, and the heaters supply enough heat to maintain temperature of the melt within an acceptable temperature range. The inventor believes that during the no-throughput condition, the temperature sensor may provide an acceptable measurement that may help to imply the temperature of the melt. However, the inventor believes that when the molding system operates in the throughput condition, each shot of melt that leaves the barrel assembly (for each cycle of the molding system) will take away amounts of heat energy from the barrel assembly, and that any heat energy contained in the barrel assembly does not necessarily transfer efficiently enough to the melt during the throughput condition, and therefore the heat energy of the melt, which is being prepared for the accumulation zone of the barrel assembly, is not necessarily controlled as well as might could be. The inventor believes that the measured temperature associated with the temperature sensors cannot be used as a reliable indication of the melt temperature during the throughput condition because flowing melt presents dynamic changes to the heating state of the barrel assembly. The inventor believes that it is not likely possible to relate the measured sensor temperature with the melt temperature (during the throughput operation) without taking into consideration the throughput of the molding process.

In summary, the problem with the temperature measurement and the control method associated with the state of the art is that under the throughput condition, the known method measures temperature of the thermal sensor that is coupled with the barrel assembly, which is a measurement of the barrel temperature; but this approach does not provide an accurate indication of temperature of the melt that flows during the throughput condition. The inventor believes that using the known method may result in problems such as (but not limited to): (i) barrel slugging or bridging problems, (ii) throughput limitation problems, (iii) non-uniformity of melt temperature, and/or (iv) accidental overheating leading to damage of components of the barrel assembly, etc. The inventor believes that the aspects of the present invention mitigates, at least in part, the problem associated with the state of the art of heating barrels of molding systems as understood by the inventor.

According to a first aspect of the present invention, there is provided a molding-system method, including a temperature-changing operation, including changing temperature of a feedstock being positioned in a barrel assembly from an out-of-barrel temperature to substantially within a processing-temperature range, in response to supplying a calculated amount of thermal energy to the barrel assembly based on a melt throughput being associated with molding articles.

According to a second aspect of the present invention, there is provided a computer including a computer-usable medium embodying instructions being executable by the computer, the instructions including executable instructions for directing the computer in accordance with the method.

According to a third aspect of the present invention, there is provided an article of manufacture of a computer, the article of manufacture including a computer-usable medium embodying instructions executable by the computer, the instructions including executable instructions for directing the computer in accordance with the method.

According to a fourth aspect of the present invention, there is provided a molding system being operable in accordance with the method.

According to a fifth aspect of the present invention, there is provided an injection-molding system being operable in accordance with the method.

According to a sixth aspect of the present invention, there is provided a metal injection-molding system being operable in accordance with the method.

According to a seventh aspect of the present invention, there is provided a molded article manufactured in accordance with the method.

A technical effect, amongst other technical effects, of the aspects of the present invention is that heating requirements associated with a molding process for molding articles may be identified (analyzed or predicted), and heaters coupled with the barrel assembly may be operated in accordance with the identified (predicted) heating requirements. This arrangement is in sharp contrast to the state of the art, which the known control method reacts to changes in the heating state of the barrel at the locations of the thermal sensors mounted to the barrel assembly.

DETAILED DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIG. 1 depicts a schematic representation of: (i) a molding system 100 (hereafter referred to as the "system 100") in accordance with a first non-limiting embodiment, (ii) an injection-molding system 111 (hereafter referred to as the "system 111") in accordance with a second non-limiting embodiment, and (iii) a metal injection-molding system 113 (hereafter referred to as the "system 113") in accordance with a third non-limiting embodiment;

FIG. 2A depicts a molding-system method 600 (hereafter referred to as the "method 600") in accordance with a fourth non-limiting embodiment, and the method 600 is used to operate the system 100, the system 111, and/or the system 113 of FIG. 1;

FIG. 2B depicts a non-limiting variant of the method 600 of FIG. 2A;

FIG. 4A depicts yet again another non-limiting variant of the method 600 of FIG. 2A;

FIG. 4B depicts once again another non-limiting variant of the method 600 of FIG. 2A.

Figure 1:
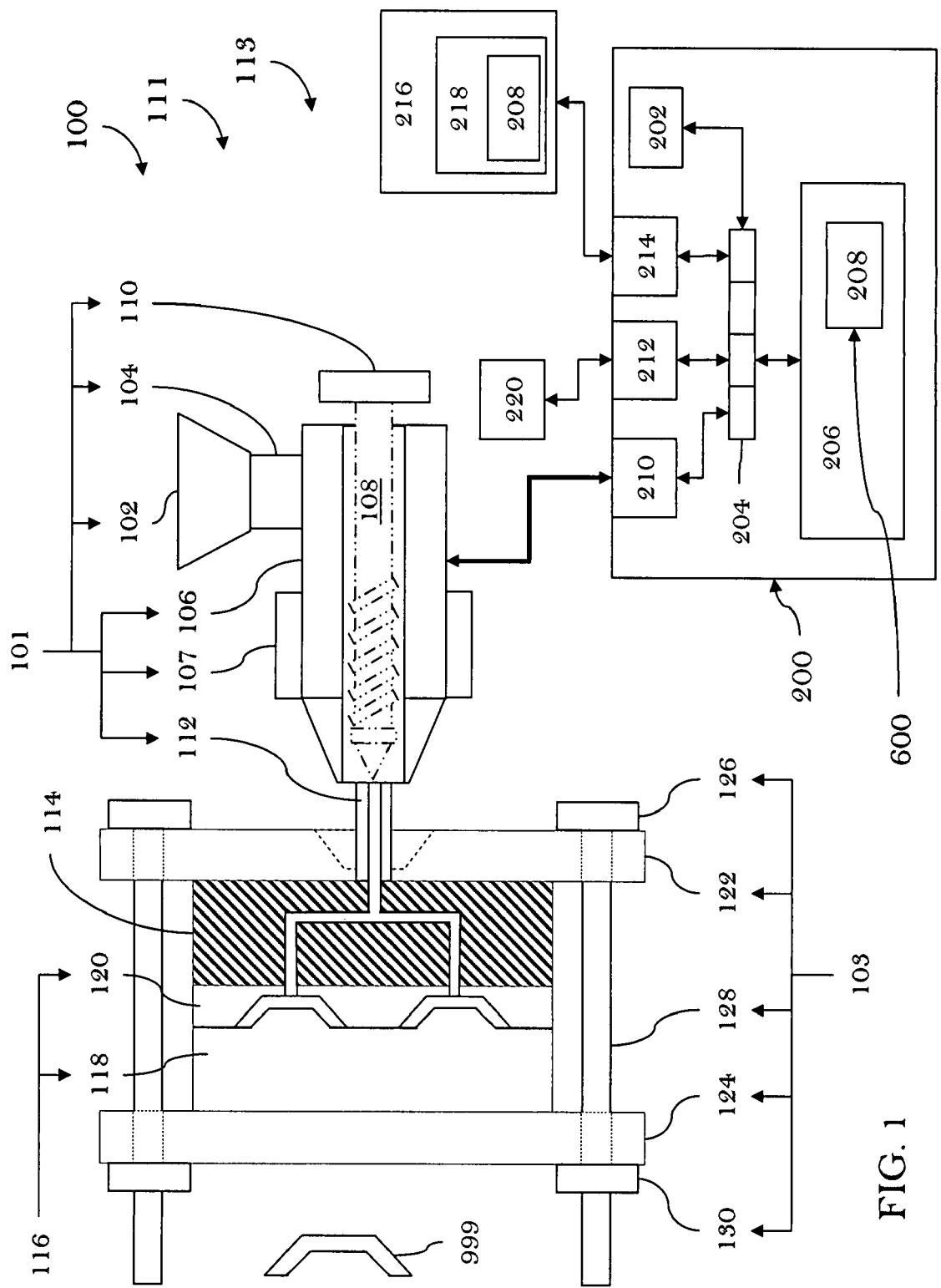

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

REFERENCE NUMERALS USED IN THE DRAWINGS

The following is a listing of the elements designated to each reference numeral used in the drawings:

| | |
|---|---|
| molding system, 100 | |
| extruder, 101 | clamp assembly, 103 |
| hopper, 102 | feed throat, 104 |
| barrel assembly, 106 | heater assembly, 107 |
| screw, 108 | screw actuator, 110 |
| machine nozzle, 112 | injection-molding system, 111 |
| metal injection-molding system, 113 | |
| hot runner, 114 | mold, 116 |
| movable mold portion, 118 | stationary mold portion, 120 |
| stationary platen, 122 | movable platen, 124 |
| clamp, 126 | tie bar, 128 |
| nuts, 130 | computer, 200 |
| processor, 202 | bus, 204 |
| instructions, 208 | input/output device, 210, 212, 214 |
| article of manufacture, 216 | computer-usable medium, 218 |
| molding-system method, 600 | temperature-changing operation, 601 |
| identification operation 602 | providing operation, 603 |
| distributing operation, 604 | calculating operation, 606 |
| supplying operation, 608 | calculation operation, 702 |
| determination operation, 704 | determining operation, 706 |
| establishing operation, 708 | identifying operation, 710 |
| optimizing operation, 712 | evaluation operation, 714 |
| evaluating operation, 714A | adding operation, 714B |
| addition operation, 714C | summing operation, 714D |
| establishment operation, 716 | checking operation, 718 |
| temperature-checking operation, 720 | |
| comparing operation, 802 | comparison operation, 804 |
| comparator operation, 806 | difference operation, 808 |
| evaluation operation, 810 | molded article, 999 |

DETAILED DESCRIPTION OF THE NON-LIMITING EMBODIMENTS

FIG. 1 depicts the schematic representation of: (i) the system 100, (ii) the system 111, and (iii) the system 113. The system 100 is a generic molding system. The system 111 is of the type that processes a plastic-based molding material. The system 113 is of the type that processes a metallic-based molding material. Since the systems 100, 111, 113 may share similar components, the description provided for the system 100 is equally applicable to the system 111 and to the system 113. The system 100, the system 111, and/or the system 113 may include components that are known to persons skilled in the art, and these known components will not be described here; these known components are described, at least in part, in the following text books (by way of example): (i) "*Injection Molding Handbook*" by Osswald/Turng/Gramann (ISBN: 3-446-21669-2; publisher: Hanser), (ii) "*Injection Molding Handbook*" by Rosato and Rosato (ISBN: 0-412-99381-3; publisher: Chapman & Hill), and/or (iii) "*Injection-molding systems*" $3^{rd}$ Edition by Johannaber (ISBN 3-446-17733-7).

The system 100 includes: (i) an extruder 101, and (ii) a clamp assembly 103. The extruder 101 includes: (i) a hopper 102, (ii) a feed throat 104, (iii) a barrel assembly 106, (iv) a heater assembly 107, (v) a screw 108 (which is also called a melt-processing screw), (vi) a screw actuator 110, and (vii) a machine nozzle 112. The extruder 101 may be: (i) a reciprocating-screw (RS) extruder, or (ii) a two-stage extruder that has a shooting pot configuration. The hopper 102 is used to receive a molding material. The feed throat 104 connects the hopper 102 to an interior channel defined by the barrel assembly 106, so that the molding material may be transferred from the hopper 102 to the interior channel of the barrel assembly 106. The screw 108 is disposed in the interior channel. The screw actuator 110 is connected to an end of the screw 108. A non-return valve (not depicted, but known) is connected with a tip of the screw 108. The non-return valve is used for: (i) accumulating a shot of molding material in an accumulation zone of the barrel assembly 106 in response to rotation of the screw 108, and (ii) prevent back flow of the melt toward the feed throat 104 in response to linear translation of the screw 108 toward the accumulation zone. The screw actuator 110 is configured to: (i) translate, and (ii) rotate the screw 108 as may be required so as to process the molding material contained in the interior channel of the barrel assembly 106. For the case where the screw 108 is translated, the check valve prevents back flow of the melt toward the feed throat 104, so that the melt located in the accumulation zone of the barrel assembly 106 may be ejected from the exit port of the barrel assembly 106, and in this manner the melt may be injected into a mold cavity of a mold 116. For the case where the screw 108 is rotated, the check valve is used to accumulate a shot of the melt in the accumulation zone of the barrel assembly 106. For the case where the melt is plastic-based, the screw 108 is used to: (i) apply frictional heat energy to the molding material as a result of the screw 108 pressing the molding material against the inner surface of the barrel assembly 106, and in this manner the molding material may be turned into a molten state, and (ii) convey the molten molding material forwardly and toward the accumulation zone of the barrel assembly 106 past the check valve. It will be appreciated that the heater assembly 107 (for this case) is used to add heat energy to the melt to prevent the melt from solidifying in the barrel assembly 106. For the case where the melt is metallic-based, the screw 108 is used to convey the melt forwardly, and the heater assembly 107 is used to: (i) convert the molding material into a molten state (either semi-solid state or a liquefied state), and prevent the melt from solidifying in the barrel assembly 106. The machine nozzle 112 is: (i) located proximate the accumulation zone, and (ii) connected to the exit port of the barrel assembly 106. Once the molding material has been processed to a satisfactory state, the screw 108 is translated forwardly so as to eject the molding material from the interior channel of the barrel assembly 106, out through the machine nozzle 112, and ultimately toward a mold cavity that is defined by the mold 116.

The mold 116 includes: (i) a movable mold half 118, and (ii) a stationary mold half 120. The mold 116 is treated as a replacable tool. It will be appreciated that from time to time the mold 116 may need to be refurbished or replaced. For the case where the mold 116 defines a plurality of mold cavities, a hot runner 114 is used to convey the molding material from the machine nozzle 112 to the plurality of cavities. For the case where the mold 116 defines a single cavity, then the hot runner 114 is not used, and the melt flows from the machine nozzle 112 to the mold cavity. The hot runner 114 is also treated as a replacable tool that is matched up or married with a particular mold. Usually, the mold 116 and the hot runner 114 are components that are sold separately from the system 100.

The clamp assembly 103 includes: (i) a stationary platen 122, (ii) a movable platen 124, (iii) clamps 126, (iv) tie bars 128, and (v) nuts 130. The movable platen 124 is movable relative to the stationary platen 122. A platen stroking actuator (not depicted, but known) is connected to the movable platen 124 and is used to stroke the movable platen 124 relative to the stationary platen 122.

For the case (which is depicted in FIG. 1) where the mold 116 defines a plurality of mold cavities, the movable mold half 118 is mounted with the movable platen 124, the hot runner 114 is mounted with the stationary platen 122, and the stationary mold half 120 is mounted with the hot runner 114, so that the movable mold half 118 faces the stationary mold half 120.

For the case (which is not depicted) where the mold 116 defines a single mold cavity, the hot runner 114 is not used, the movable mold half 118 is mounted with the movable platen 124, and the stationary mold half 120 is mounted with the stationary platen 122, so that the movable mold half 118 faces the stationary mold half 120.

The clamps 126 are mounted to respective corners of the stationary platen 122. The nuts 130 are mounted to respective corners of the movable platen 124. The tie bars 128 are connected with and extend from respective clamps 126 toward respective nuts 130, so that the tie bars 128 may interact with respective nuts 130. The nuts 130 are used to selectively lock and unlock the tie bars 128 to the respective corners of the movable platen 124. For the case where the nuts 130 are used to lock the movable platen 124 with the tie bars 128, the clamps 126 may be actuated so as to apply a clamping force to the mold 116. For the case where the nuts 130 are used to unlock the movable platen 124 from the tie bars 128, the movable platen 124 may be moved relative to the stationary platen 122.

In operation, the nuts 130 are actuated so that the tie bars 128 may be unlocked from the movable platen 124, and in this manner the movable platen 124 may be moved toward the stationary platen 122 to the point where the mold 116 may be closed so as to form the mold cavities. The clamps 126 are actuated so as to apply the clamping force to the mold 116 (via the platens 122, 124 and the tie bars 128). The molding material is ejected, under pressure, from the extruder 101 into the mold cavities of the mold 116. The clamping force is sufficient enough to maintain the mold 116 closed shut during injection of the molding material, so that the molding material does not inadvertently leak or flash (under pressure) from the mold 116. Once molded articles are formed in the mold cavities, the clamps 126 are deactivated and the nuts 130 are unlocked so as to unlock the tie bars 128 from the movable platen 124. A mold break force is applied by a mold-break actuator (not depicted, but known) to the mold 116 so as to break apart the mold 116. The movable platen 124 is stroked away from the stationary platen 122 so as to expose the molded articles. The molded article 999 is then ejected or removed from the mold cavities, either by: (i) using ejection mechanisms (not depicted, but known), or (ii) using a robot (not depicted, but known).

A computer 200 is used to control operations of the system 100. The computer 200 includes a memory 206 that embodies or operatively supports instructions 208 (which are programmed executable instructions) that are executable by the computer 200. The instructions 208 are programmed operations associated with the method 600. The computer 200 is operatively coupled to the system 100 (that is, the computer 200 is operatively coupled to computer-controllable components of the system 100). The instructions 208 include executable instructions for directing the computer 200 to control the system 100 in accordance with the method 600, which is depicted in FIGS. 2A, 2B, 3A, 3B, 4A, 4B and 5. It will be appreciated that the instructions 208 may be constructed by using a high-level computer programming language, such as C++, etc, and a compiler may be used to translate the high-level computer programming language into the instructions 208.

The computer 200 (which may be a general purpose computer, programmable logic device, etc) also includes: (i) a processor 202, (ii) a bus 204, (iii) the memory 206, (iv) input and output interfaces (hereafter referred to as the "I/O") 210, 212 and 224, and (v) a human-machine interface (hereafter referred to as the "HMI") 220. The processor 202 is also known as a central processing unit (CPU) that is a computer component that interprets the instructions 208. The bus 204 couples the processor 202 with the memory 206 and with the I/O 210, 212 and 224. The I/O 210 interfaces the computer 200 with the computer controllable elements of the system 100. The I/O 212 interfaces the computer 200 with the HMI 220. The I/O 214 is used to interface an article of manufacture 216 with the computer 200. For the case where the article of manufacture 216 is a signal transmitted over a network (such as the Internet, etc) the I/O 214 is a communications interface (such as a modem, etc). For the case where the article of manufacture 216 is a disk (such as an optical disk or a floppy disk), the I/O 214 is a disk-reading interface. The article of manufacture 216 includes a computer-usable medium 218 (such as electrical signals and/or optical signals transported by a network, a floppy disk, compact disk, an optical disk, etc) that embodies or supports the instructions 208. The article of manufacture 216 is used to deliver the instructions 208 to the memory 206 (via the I/O 214), so that the computer 200 may control the system 100 (or the system 111 or the system 113) according to the method 600. In this manner, the system 100, the system 111, and/or the system 113 are operable in accordance with the method 600.

FIG. 2A depicts the method 600. The method 600 includes a temperature-changing operation 601. The temperature-changing operation 601 includes: (i) an identification operation 602, and (ii) a providing operation 603. The identification operation 602 includes identifying a melt throughput that is associated with molding articles using the barrel assembly 106 (depicted in FIG. 1). The providing operation 603 includes providing a calculated amount of thermal energy to the barrel assembly 106 based on, at least in part, the melt throughput associated with the identification operation 602. In response, the calculated amount of thermal energy that is provided to the barrel assembly 106 changes temperature of a feedstock that is positioned in the barrel assembly 106 from an out-of-barrel temperature to substantially within a processing-temperature range. The temperature-changing operation 601 includes either raising or lowering the temperature of the feedstock, as may be required.

FIG. 2B depicts the non-limiting variant of the method 600 of FIG. 2A, in which the method 600 further includes (optionally): (i) a distributing operation 604, (ii) a calculating operation 606, and (iii) a supplying operation 608.

The distributing operation 604 includes distributing the calculated (or predicted) amount of thermal energy along heating zones of the barrel assembly 106 based on: (i) a process requirement associated with the systems 100, 111, 113, and (ii) an attribute (which is described with more detail below) of the barrel assembly 106. The calculating operation 606 includes calculating the calculated amount of thermal energy (preferably, calculating the total amount of thermal energy). The calculated amount of thermal energy is useable for increasing temperature of the feedstock. It will be appreciated that the amount of thermal energy that is to be calculated may be done by an engineer that is knowledgeable in the engineering concepts associated with thermal energy management. The supplying operation 608 includes supplying the calculated amount of thermal energy to the barrel assembly 106. The barrel assembly 106 transfers, at least in part, the calculated amount of thermal energy to the feedstock that is positioned in the barrel assembly 106.

Figure 3A:
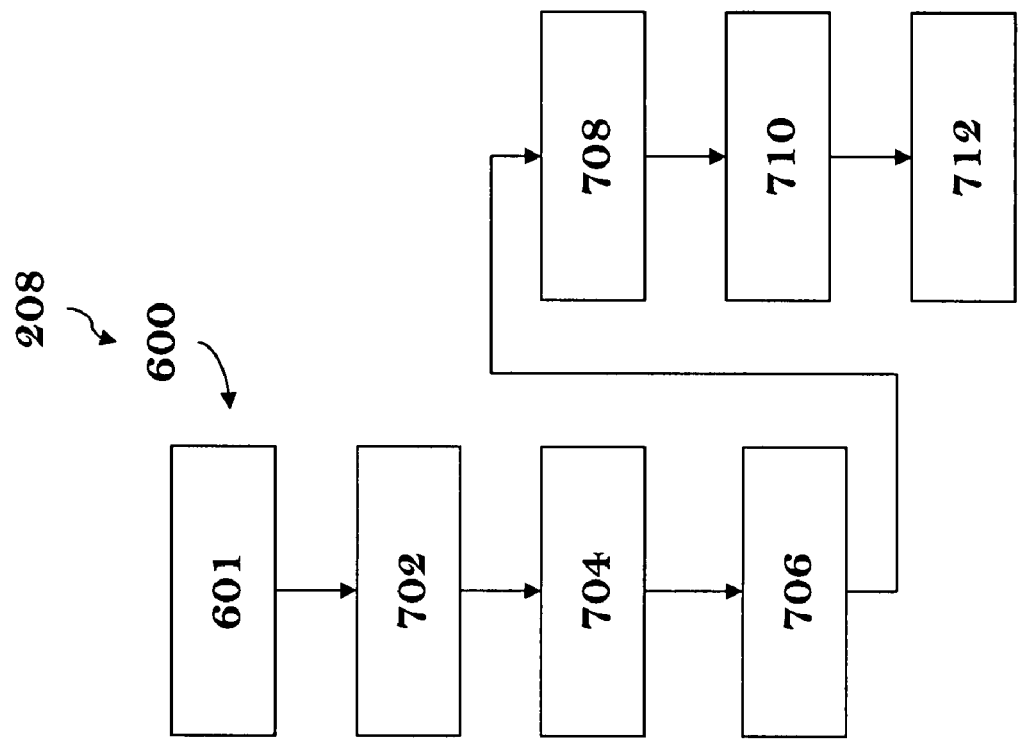
FIG. 3A depicts another non-limiting variant of the method 600 of FIG. 2A.

FIG. 3A depicts another non-limiting variant of the method 600 of FIG. 2A, in which the method 600 further includes (optionally): (i) a calculation operation 702, (ii) a determination operation 704, (iii) a determining operation 706, (iv) an establishing operation 708, (v) an identifying operation 710, and (vi) an optimizing operation 712.

The calculation operation 702 includes calculating a thermal set-up (such as an initial starting temperature, etc) for the heater assembly 107. The determination operation 704 includes determining of factors associated with the molded article 999. The factors include: (i) a weight of the molded article 999, (ii) a molding-system cycle time (hereafter referred to as the "cycle time") associated with making the molded article 999, and (iii) a desired temperature range associated with the feedstock located in the barrel assembly 106. It is understood that the feedstock is used to make the molded article 999. The determining operation 706 includes determining an amount of thermal energy to be transferred to the barrel assembly 106 based on: (i) the factors associated with the molded article 999, and (ii) heat energy lost to convection and radiation outside of the barrel assembly 106 and heat energy lost to heat sinks at operating temperatures. The establishing operation 708 includes establishing a thermal-energy distribution to be applied to heating zones of the barrel assembly 106. The thermal-energy distribution is based on any one of: (i) predetermined rules, and (ii) an approach based on a process optimization. The identifying operation 710 includes identifying (if the approach is based on predetermined rules) the amount of thermal energy is to be applied to each heating zone based on predetermined rules so that specific amounts of heat energy may be applied to selected heating zones of the barrel assembly 106. The optimizing operation 712 includes optimizing (if the approach is based on the process optimization) the thermal-energy distribution. The thermal-energy distribution represents quantities of heat energy that are to be applied to respective heating zones of the barrel assembly 106 based on (or according to) an optimization of processing requirements that are associated with the molding system 100. For example, if more heat energy should be applied closer to the feed throat 104 (to prevent slugging, etc), the thermal-energy distribution should take into account that more heat is to be applied to the feed throat 104.

Figure 3B:
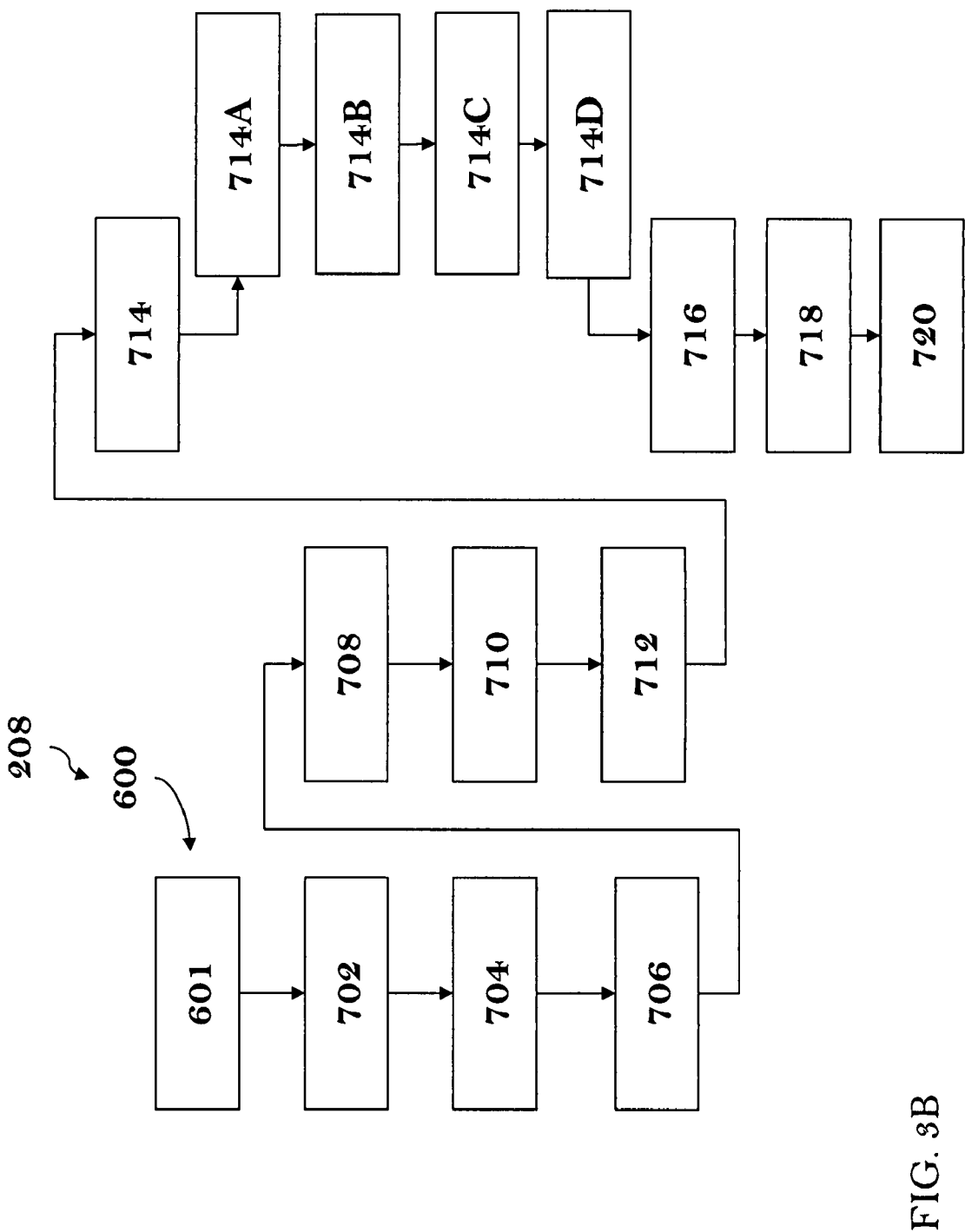
FIG. 3B depicts yet another non-limiting variant of the method 600 of FIG. 2A.
Figure 5:
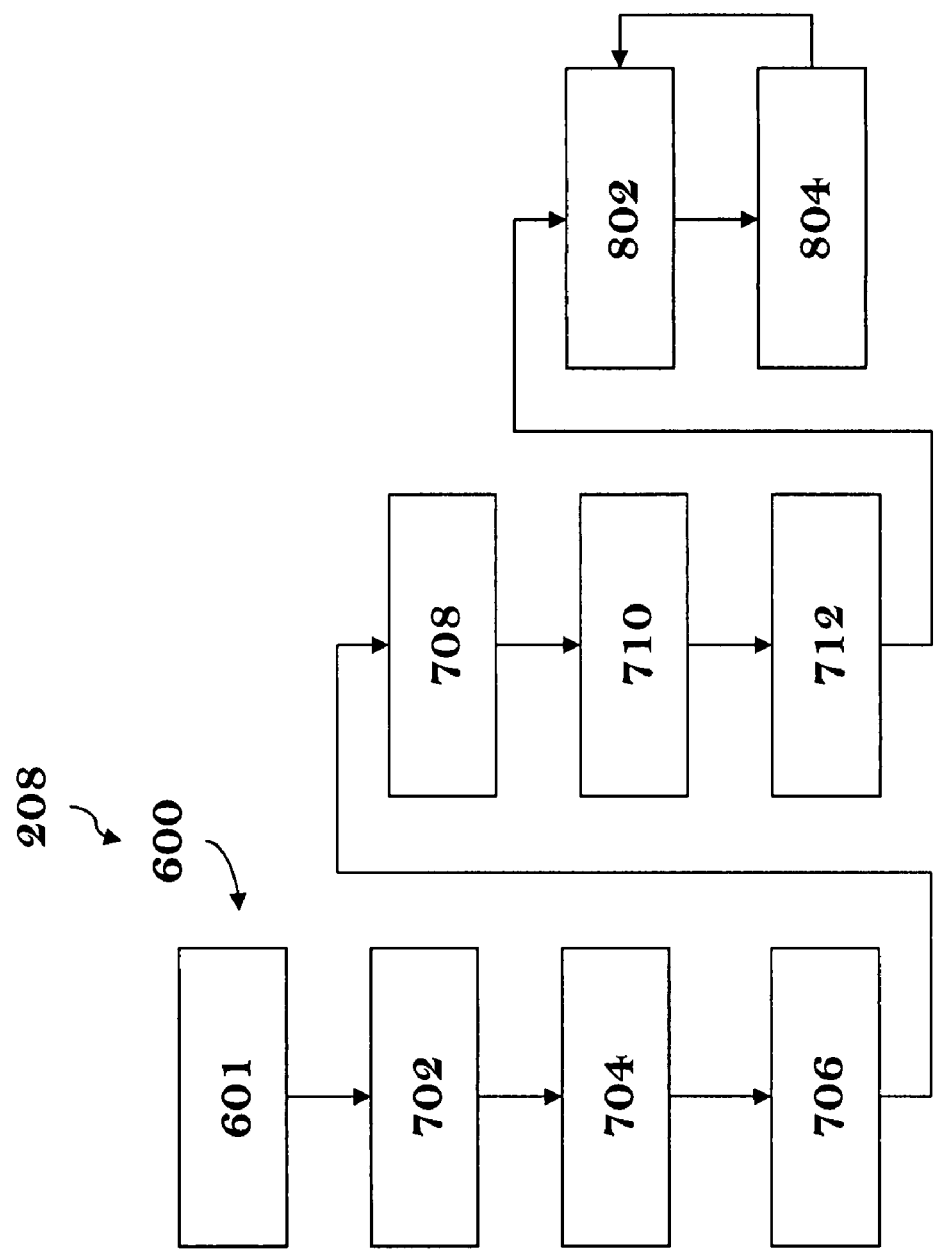
FIG. 5 depicts yet once again another non-limiting variant of the method 600 of FIG. 2A.

FIG. 3B depicts yet another non-limiting variant of the method 600 of FIG. 2A, in which the method 600 further includes (optionally): (i) an evaluation operation 714, (ii) an establishment operation 716, (iii) a checking operation 718, and/or (iv) a temperature-checking operation 720.

The evaluation operation 714 includes: (i) an evaluating operation 714A, (ii) an adding operation 714B, (iii) an addition operation 714C, and (iv) a summing operation 714D. The evaluating operation 714A includes evaluating (if there is a concern with any one of: (a) an amount of screw torque (associated with the screw 108), and (b) an amount of residency time, and (c) if recovery optimization is needed, an allocation of amounts of an un-melted feedstock across the heating zones of the barrel assembly 106. The adding operation 714B includes adding (if the molded article 999 is to be made with a minimum molding-system cycle time associated with the system 100 operating under maximum throughput) a change in heat energy applied to the heating zones: (A) apply more heat energy to the heating zones located proximate of the feed throat 104 of the barrel assembly 106, or (B) apply less heat energy to the heating zones that are located distal of the feed throat 104, so that the feedstock may be melted before the feedstock is injected from the barrel assembly 106 to the mold 116. The addition operation 714C includes adding (if there is a screw-torque issue, such as the screw 108 cannot be rotated as a result of too much friction from the feedstock that is conveyed through the barrel assembly 106) a change in heat energy applied to the heating zones: (A) apply more heat energy to the heating zones located proximate of the feed throat 104, or (B) apply less heat energy to the heating zones that are located distal of the feed throat 104. The summing operation 714D includes changing (if the molded article 999 has a determined size that is to be made with a desired cycle time, and if the amount of residency time is high) the heat energy that applied to the heating zones, such as: (A) applying less heat energy to the heating zones located proximate of the feed throat 104, or (B) applying more heat energy to the heating zones that are located distal of the feed throat 104 and proximate of an exit of the barrel assembly 106.

The establishment operation 716 includes establishing (if an optimal barrel temperature gradient is desired or a feedstock quality is desired) an optimum amount of thermal-energy to be transferred to the barrel assembly 106 based on a residency time per heating zone.

The checking operation 718 includes: (i) checking whether running temperatures of the barrel assembly 106 are safe, and (ii) readjusting, if the running temperatures associated with the heating zones are not safe, an allotment of thermal energy across the heating zones.

The temperature-checking operation 720 includes: (i) determining a set-up condition associated with starting barrel temperatures if a starting condition needs to be different than a running barrel condition, (ii) monitoring and controlling temperatures associated with the barrel assembly 106 during a molding-system idle operation associated with the system 100 to determine whether a setting associated with an amount of thermal-energy to be supplied is sufficient to overcome lost heat energy and to maintain the feedstock disposed in the barrel assembly 106 within a desired feedstock-temperature range, (iii) setting, if there is a time delay from when thermal-energy generation is started to when thermal energy is delivered to the feedstock, the barrel assembly 106 at a higher temperature (or lower temperature) during the idle operation of the system 100 so that once the system 100 begins making molded articles, the higher temperature compensates for a time lag associated with transferring a degree of thermal energy from the heater assembly 107 to the feedstock via the barrel assembly 106, and/or (iv) adding an additional amount of thermal energy to the barrel assembly 106 so that the thermal energy that was added is used to offset the time lag associated with transferring the degree of thermal energy from the heater assembly 107 to the feedstock (if the system 100 is expected to operate in a high throughput mode in which a temperature of the barrel assembly 106 during production operation of the system 100 may be significantly higher than a feedstock temperature). The higher temperature for the barrel assembly 106 at idle (that is, the no-throughput condition) may not be appropriate because the feedstock may (unfortunately) evaporate at the higher temperature immediately before the system 100 starts molding articles.

FIG. 4A depicts yet again another non-limiting variant of the method 600 of FIG. 2A, in which the method 600 further includes (optionally) after the molded article 999 is manufactured: (i) a comparing operation 802, and (ii) a comparison operation 804.

The comparing operation 802 includes comparing a shot weight used to mold an article against a shot-weight set point value by either: (i) calculating the shot weight based on displacement of the screw 108, and/or (ii) measuring a weight of the article that was molded (either manually or by using a robot that places the article on weigh scale, etc). The comparing operation 802 also includes (if the shot weight is significantly different than the shot-weight set point value): (A) adjusting a shot size to be injected into the mold 116, (B) determining an amount of thermal energy to be transferred to the barrel assembly 106 based on the factors (which are described below), and based on a sum of thermal energy that is lost to: (i) convection and radiation outside of the barrel assembly 106, and (ii) heat sinks that are active during the operating temperature associated with the barrel assembly 106. The factors include: (a) the weight of a molded article 999, (b) a cycle time associated with making the molded article 999, and (c) a desired temperature range associated with the feedstock located in the barrel assembly 106. The comparing operation 802 also includes performing the comparison operation 804 if the shot weight is not significantly different than the shot-weight set point value.

The comparison operation 804 includes comparing an indication of the cycle time against a cycle-time set point value. The comparison operation 804 also includes (if the indication of the cycle time is sufficiently different from the cycle-time set point value): (A) re-adjusting the cycle time of the system 100, (B) determining a thermal-energy distribution across heating zones based on a processing optimization algorithm (which may include, recalculating the thermal energy to be transferred to the barrel assembly 106 so that the molding-system process of the system 100 is satisfied), (C) re-adjusting the heater assembly 107 so that the heater assembly 107 may provide thermal energy to the barrel assembly 106, and (D) performing the comparing operation 802. The comparison operation 804 also includes performing the comparing operation 802 if the indication of the cycle time is not sufficiently different from the cycle-time set point value.

FIG. 4B depicts once again another non-limiting variant of the method 600 of FIG. 2A, in which the method 600 further includes (optionally): (i) a comparator operation 806, a difference operation 808, and/or an evaluation operation 810.

The comparator operation 806 includes comparing a measured screw torque against a range of acceptable screw torques (associated with the screw 108). The comparator operation 806 also includes performing the comparing operation 802 if the measured screw torque is within the range of acceptable screw torques (that is, the screw 108 is operating safely). The comparator operation 806 includes (if the measured screw torque is not within the range of acceptable screw torques; that is, the screw 108 is not operating safely): (A) determining the thermal-energy distribution across the heating zones based on the processing optimization algorithm, (B) adjusting the heater assembly 107 so that the heater assembly 107 may provide, to the barrel assembly 106, the amount of thermal energy that was determined, and (C) performing the comparing operation 802.

The difference operation 808 includes comparing a measured barrel temperature against a range of acceptable barrel temperatures (to determine if the barrel assembly 106 is operating safely). The difference operation 808 also includes performing the comparing operation 802 if the measured barrel temperature is within the range of acceptable barrel temperatures. The difference operation 808 also includes (if the measured barrel temperature is not within the range of acceptable barrel temperatures): (A) determining the thermal-energy distribution across the heating zones based on the processing optimization algorithm, (B) adjusting the heater assembly 107 coupled with the barrel assembly 106 so that the heater assembly 107 may provide, to the barrel assembly 106, the amount of thermal energy that was determined, and (C) performing the comparing operation 802.

The evaluation operation 810 includes comparing the amount of thermal energy lost against a lost thermal energy set point value, and if improved precision is needed, measuring temperatures associated with temperature sensors coupled to the barrel assembly 106. The evaluation operation 810 also includes performing the comparing operation 802 if the amount of thermal energy lost is not significantly different than the lost thermal energy set point value. The evaluation operation 810 also includes (if the amount of thermal energy lost is significantly different than the lost thermal energy set point value): (A) adjusting the lost thermal energy set point value (due to the running temperatures), (B) determining the thermal-energy distribution across the heating zones based on the processing optimization algorithm, (C) adjusting the heater assembly 107 so that the heater assembly 107 may provide, to the barrel assembly 106, the amount of thermal energy that was determined, and (D) performing the comparing operation 802.

FIG. 5 depicts yet once again another non-limiting variant of the method 600 of FIG. 2A, in which the method 600 further includes (optionally): before manufacturing the molded article 999, the following operations (that have been previously described): (i) the calculation operation 702, (ii) the determination operation 704, (iii) the determining operation 706, (iv) the establishing operation 708, (v) the identifying operation 710, (vi) the optimizing operation 712, (vii) the comparing operation 802, and (viii) the comparison operation 804.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is to be understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is to be protected by way of letters patent are limited only by the scope of the following claims:

What is claimed is:

1. A molding-system method, comprising:
   a temperature-changing operation, including:
      an identification operation, including identifying a melt throughput being associated with molding articles using a barrel assembly; and
      a providing operation, including providing a calculated amount of thermal energy to the barrel assembly based on, at least in part, the melt throughput associated with the identification operation, and in response, the calculated amount of thermal energy that is provided to the barrel assembly changes temperature of a feedstock that is positioned in the barrel assembly from an out-of-barrel temperature to substantially within a processing-temperature range,
      further comprising:
   before manufacturing a molded article
      (I) a calculation operation, including calculating a thermal set-up for heaters coupled to the barrel assembly;
      (II) a determination operation, including determining of factors associated with the molded article;
      (III) a determining operation, including determining an amount of thermal energy to be transferred to the barrel assembly;
      (IV) an establishing operation, including establishing a thermal-energy distribution to be applied to heating zones of the barrel assembly;
      (V) an identifying operation, including identifying the amount of thermal energy is to be applied to each heating zone so that specific amounts of heat energy may be applied to selected heating zones; and
      (VI) an optimizing operation, including optimizing the thermal-energy distribution to be applied to the heating zones based on an optimization of molding-system processing requirements; and after the molded article is manufactured:
      (VII) a comparing operation, including;
         (i) comparing a shot weight used to mold an article against a shot-weight set point value,
         (ii) if the shot weight is significantly different than the shot-weight set point value:
            (A) adjusting a shot size to be injected into the mold,
            (B) determining the amount of thermal energy to be transferred to the barrel assembly based on the factors and based on a sum of thermal energy being lost to convection and radiation outside of the barrel assembly, and being lost to heat sinks at operating temperatures; and
      (VIII) a comparison operation, including:
         (i) comparing an indication of a molding-system cycle time against a cycle-time set point value,
         (ii) if the indication of the molding-system cycle time is sufficiently different from the cycle-time set point value:
            (A) re-adjusting the molding-system cycle time,
            (B) determining the thermal-energy distribution across the heating zones based on a processing optimization algorithm, which includes recalculating the thermal energy to be transferred to the barrel assembly so that a molding-system process is satisfied, and
            (C) re-adjusting a heater assembly being coupled with the barrel assembly so that the heater assembly may provide the thermal energy to the barrel assembly.

2. The molding-system method of claim 1, further comprising:
   a distributing operation, including distributing the calculated amount of thermal energy along heating zones of the barrel assembly based on: (i) a process requirement, and (ii) an attribute of the barrel assembly.

3. The molding-system method of claim 1, further comprising:
   a calculating operation, including calculating the calculated amount of thermal energy, the calculated amount of thermal energy being useable for increasing the temperature of the feedstock.

4. The molding-system method of claim 1, further comprising:
   a supplying operation, including supplying the calculated amount of thermal energy to the barrel assembly, the barrel assembly transferring, at least in part, the calculated amount of thermal energy to the feedstock.

5. The molding-system method of claim 1, further comprising:
   before manufacturing a molded article
      (I) a calculation operation, including calculating a thermal set-up for a heater assembly coupled to the barrel assembly;
      (II) a determination operation, including determining of factors associated with the molded article;
      (III) a determining operation, including determining an amount of thermal energy to be transferred to the barrel assembly;
      (IV) an establishing operation, including establishing a thermal-energy distribution to be applied to heating zones of the barrel assembly;
      (V) an identifying operation, including identifying the amount of thermal energy is to be applied to each heating zone so that specific amounts of heat energy may be applied to selected heating zones; and
      (VI) an optimizing operation, including optimizing the thermal-energy distribution to be applied to the heating zones based on an optimization of molding-system processing requirements.

6. The molding-system method of claim 5, further comprising:
   (VII) an evaluation operation, including:
      (i) an evaluating operation, including evaluating, if there is a concern with any of: an amount of screw torque associated with a screw, and an amount of residency time, and if a recovery optimization is needed, an allocation of amounts of an un-melted feedstock across the heating zones of the barrel assembly;
      (ii) an adding operation, including adding, if the molded article is to be made with a minimum molding-system cycle time operating under maximum throughput,
         (a) apply more heat energy to the heating zones located proximate of a feed throat of the barrel assembly, and
         (b) apply less heat energy to the heating zones being located distal of the feed throat so that the feedstock may be melted before the feedstock is injected from the barrel assembly to a mold, (ii) an addition operation, including adding, if there is a screw-torque issue, in that the screw cannot be rotated as a result of too much friction from the feedstock being conveyed through the barrel assembly, (i) apply more heat energy to the heating zones located proximate of the feed throat, and (ii) apply less heat energy to the heating zones being located distal of the feed throat; and (iii) a summing operation, including changing, if the molded article having a determined size is to be made with a molding-system cycle time and if the amount of residency time is high, the heat energy to be applied to the heating zones by: (i) applying less heat energy to the heating zones located proximate of the feed throat, and (ii) applying more heat energy to the heating zones being located distal of the feed throat and proximate of an exit of the barrel assembly.

7. The molding-system method claim 6, further comprising:

(VIII) an establishment operation, including establishing an optimum amount of thermal-energy to be transferred to the barrel assembly based on a residency time per heating zone if an optimal barrel temperature gradient is desired or a feedstock quality is desired.

8. The molding-system method claim 7, further comprising:

(IIX) a checking operation, including:
(i) checking whether running temperatures of the heating zones of the barrel assembly are safe, and
(ii) readjusting, if the running temperatures are not safe, an allotment of thermal energy across the heating zones.

9. The molding-system method claim 8, further comprising:

(IX) a temperature-checking operation, including:
(i) determining a set-up condition associated with starting barrel temperatures if a starting condition needs to be different than a running barrel condition,
(ii) monitoring and controlling temperatures associated with the barrel assembly during a molding-system idle operation to determine whether a setting associated with an amount of thermal-energy to be supplied is sufficient to overcome any heat energy lost and to maintain the feedstock disposed in the barrel assembly within a desired feedstock-temperature range,
(iii) setting, if there is a time delay from when thermal-energy generation is started to when the thermal energy is delivered to the feedstock, the barrel assembly at a higher temperature (or lower) during the molding-system idle operation so that once molded articles are made, the higher temperature compensating for a time lag associated with transferring a degree of the thermal energy from the heater assembly to the feedstock via the barrel assembly, and
(iv) adding an additional amount of thermal energy to the barrel assembly so that the thermal energy that was added is used to offset the time lag associated with transferring the degree of the thermal energy from the heater assembly to the feedstock, if a high throughput mode is requested in which the temperature of the barrel assembly during production operation may be significantly higher than a feedstock temperature, the higher temperature for the barrel assembly at idle may not be appropriate because the feedstock may evaporate at the higher temperature immediately before the molded article is made.

10. The molding-system method of claim 1, further comprising:

after a molded article is manufactured:
(I) a comparing operation, including:
(i) comparing a shot weight used to mold an article against a shot-weight set point value,
(ii) if the shot weight is significantly different than the shot-weight set point value:
(A) adjusting a shot size to be injected into the mold,
(B) determining an amount of thermal energy to be transferred to the barrel assembly based on factors and based on a sum of thermal energy being lost to convection and radiation outside of the barrel assembly, and being lost to heat sinks at operating temperatures; and
(II) a comparison operation, including:
(i) comparing an indication of a molding-system cycle time against a cycle-time set point value, and
(ii) if the indication of the molding-system cycle time is sufficiently different from the cycle-time set point value:
(A) re-adjusting the molding-system cycle time,
(B) determining a thermal-energy distribution across heating zones based on a processing optimization algorithm, including recalculating the thermal energy to be transferred to the barrel assembly so that a molding-system process is satisfied, and
(C) re-adjusting a heater assembly being coupled with the barrel assembly so that the heater assembly may provide the thermal energy to the barrel assembly.

11. The molding-system method of claim 1, further comprising:

after a molded article is manufactured:
(I) a comparing operation, including:
(i) comparing a shot weight used to mold an article against a shot-weight set point value by either: (i) calculating the shot weight based on displacement of a screw, or (ii) measuring a weight of the article that was molded (either manually or by using a robot that places the article on weigh scale),
(iii) if the shot weight is significantly different than the shot-weight set point value:
(A) adjusting a shot size to be injected into the mold,
(B) determining an amount of thermal energy to be transferred to the barrel assembly based on factors and based on a sum of thermal energy being lost to convection and radiation outside of the barrel assembly, and being lost to heat sinks at operating temperatures, the factors include:
(a) the weight of the molded article,
(b) a molding-system cycle time associated with making the molded article, and
(C) a desired temperature range associated with the feedstock located in the barrel assembly, the feedstock being used to make the molded article, and
(C) performing a comparison operation,
(iii) performing the comparison operation if the shot weight is not significantly different than the shot-weight set point value; and
(II) the comparison operation, including:
(i) comparing an indication of the molding-system cycle time against a cycle-time set point value, (iii) if the indication of the molding-system cycle time is sufficiently different from the cycle-time set point value:
  (A) re-adjusting the molding-system cycle time,
  (B) determining a thermal-energy distribution across heating zones based on a processing optimization algorithm, including recalculating the thermal energy to be transferred to the barrel assembly so that a molding-system process is satisfied,
  (C) re-adjusting a heater assembly coupled with the barrel assembly so that the heater assembly may provide the thermal energy to the barrel assembly, and
  (D) performing the comparing operation, and
(iii) performing the comparing operation if the indication of the molding-system cycle time is not sufficiently different from the cycle-time set point value.

12. The molding-system method of claim 10, further comprising:
(III) a comparator operation, including:
  (i) comparing a measured screw torque against a range of acceptable screw torques associated with a screw,
  (ii) performing the comparing operation if the measured screw torque is within the range of acceptable screw torques in which the screw is operating safely, and
  (iii) if the measured screw torque is not within the range of acceptable screw torques in which the screw is not operating safely,
    (A) determining the thermal-energy distribution across the heating zones based on the processing optimization algorithm,
    (B) adjusting the heater assembly coupled with the barrel assembly so that the heater assembly may provide, to the barrel assembly, the amount of thermal energy that was determined, and
    (C) performing the comparing operation.

13. The molding-system method of claim 12, further comprising:
(IV) a difference operation, including:
  (i) comparing a measured barrel temperature against a range of acceptable barrel temperatures (to determine if the barrel assembly is operating safely),
  (ii) performing the comparing operation if the measured barrel temperature is within the range of acceptable barrel temperatures, and
  (iii) if the measured barrel temperature is not within the range of acceptable barrel temperatures,
    (A) determining the thermal-energy distribution across the heating zones based on the processing optimization algorithm,
    (B) adjusting the heater assembly coupled with the barrel assembly so that the heater assembly may provide, to the barrel assembly, the amount of thermal energy that was determined, and
    (C) performing the comparing operation.

14. The molding-system method of claim 13, further comprising:
(V) an evaluation operation, including:
  (i) comparing the amount of thermal energy lost against a lost thermal energy set point value, and if improved precision is needed, measuring, temperatures associated with temperature sensors coupled to the barrel assembly,
  (ii) performing the comparing operation if the amount of thermal energy lost is not significantly different than the lost thermal energy set point value, and
  (iii) if the amount of thermal energy lost is significantly different than the lost thermal energy set point value,
    (A) adjusting the lost thermal energy set point value due to running temperatures of the heating zones of the barrel assembly,
    (B) determining the thermal-energy distribution across the heating zones based on the processing optimization algorithm,
    (C) adjusting the heater assembly coupled with the barrel assembly so that the heater assembly may provide, to the barrel assembly, the amount of thermal energy that was determined, and
    (D) performing the comparing operation.

15. A molding system being operable in accordance with the molding-system method of claim 1.

16. An injection-molding system being operable in accordance with the molding-system method of claim 1.

17. A metal injection-molding system being operable in accordance with the molding-system method of claim 1.

* * * * *